US012762608B2

(12) United States Patent
Roman et al.

(10) Patent No.: US 12,762,608 B2
(45) Date of Patent: Oct. 13, 2026

(54) METHOD, SYSTEM AND COMPUTER PROGRAM FOR PROVIDING INFORMATION OF AN APPARATUS ON DISPLAY

(71) Applicant: Sony Group Corporation, Tokyo (JP)

(72) Inventors: Andres Jose Roman, Barcelona (ES); Eloy Calatrava, Barcelona (ES)

(73) Assignee: SONY GROUP CORPORATION, Tokyo (JP)

(*) Notice: Subject to any disclaimer, the term of this patent is extended or adjusted under 35 U.S.C. 154(b) by 133 days.

(21) Appl. No.: 18/444,854

(22) Filed: Feb. 19, 2024

(65) Prior Publication Data

US 2024/0331019 A1 Oct. 3, 2024

(30) Foreign Application Priority Data

Mar. 29, 2023 (GB) ..................................... 2304610

(51) Int. Cl.

*G06Q 30/0601* (2023.01)
*G06K 19/06* (2006.01)
*H04L 51/02* (2022.01)

(52) U.S. Cl.

CPC ... *G06Q 30/0641* (2013.01); *G06K 19/06037* (2013.01); *G06Q 30/0623* (2013.01); *G06Q 30/0631* (2013.01); *H04L 51/02* (2013.01)

(58) Field of Classification Search

None
See application file for complete search history.

(56) References Cited

U.S. PATENT DOCUMENTS

| | | | | |
|---|---|---|---|---|
| 11,170,409 | B2 * | 11/2021 | Walden | G06Q 10/0833 |
| 2003/0135429 | A1 * | 7/2003 | Pous | G06Q 30/0641 705/26.7 |
| 2004/0198386 | A1 * | 10/2004 | Dupray | G01S 5/02 455/456.1 |
| 2009/0225000 | A1 * | 9/2009 | Rosander | G06F 3/1423 705/20 |
| 2015/0302474 | A1 * | 10/2015 | Lampert | G06Q 30/0601 705/14.53 |
| 2018/0052826 | A1 * | 2/2018 | Chowdhary | G06F 40/58 |
| 2019/0156167 | A1 * | 5/2019 | Singh | G06Q 20/367 |
| 2022/0286725 | A1 | 9/2022 | Seed | |
| 2023/0294293 | A1 * | 9/2023 | Tosswill | B25J 11/00 345/468 |

FOREIGN PATENT DOCUMENTS

JP 2022023310 A 2/2022

* cited by examiner

*Primary Examiner* — Kito R Robinson
(74) *Attorney, Agent, or Firm* — Tucker Ellis LLP

(57) ABSTRACT

A method of providing information of an apparatus on display in a venue. The method includes receiving information identifying the apparatus and the venue in which the apparatus is on display from a user device; and generating, by a server, a product information webpage based on the information identifying the apparatus and the venue for providing a recommendation of at least one product to the user device; wherein the information identifying the apparatus and the venue is represented by an image of a machine readable visual representation being displayed on the apparatus.

18 Claims, 10 Drawing Sheets

METHOD, SYSTEM AND COMPUTER PROGRAM FOR PROVIDING INFORMATION OF AN APPARATUS ON DISPLAY

RELATED APPLICATION DATA

This application claims the benefit of UK Application No. 2304610.5, filed Mar. 29, 2023, the disclosure of which is incorporated here by reference in its entirety.

BACKGROUND

Field of the Disclosure

The present technique relates to a method, system and computer program for providing information of an apparatus on display in a venue.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Electronic apparatuses equipped with a display device, such as televisions, laptop computers, tablets, and mobiles phones, typically have a "demonstration mode" which is a special setting designed to optimize the apparatus's display for demonstrating various functional features in a venue, such as a retail store, a showroom, or an exhibition hall. The demonstration mode can be accessed through a television's menu settings and a short demonstration video clip may be played on loop to showcase the apparatus's capabilities such as enhanced brightness, contrast, and colour saturation, as well as advanced features like motion smoothing and edge enhancement of the display to create a more eye-catching and attractive visual display to potential buyers. Different operating modes may be compared in a split screen or picture-in-picture fashion.

Information of these electronic apparatuses such as the price tag and product features summaries are usually provided on printed labels disposed next to the models on the shelf. Potential buyers can also access websites of the manufacturers or retailers through their own mobile devices to reveal more detailed information of the models, particularly promotional information such as limited-time discount offers, free samples of related products, interest free instalment plans, complementary products or services that can be bundled with the electronic apparatus at a potential discount and more detailed information on those bundled products or services and the like. In order to do this, a potential buyer needs to note down the model name of the product on display, and search for the model name in the manufacturer website or retailer website. Once the potential buyer has decided on a certain model, he or she needs to go to the customer service in the store and checks the availability of the model in the store's inventory through a retail management system.

In view of this there is expected to be a desire for current retail information systems to provide a more efficient and convenient method for the users to access information of products on display in a venue.

It is an aim of embodiments of the present disclosure to at least address this issue.

SUMMARY

According to the disclosure, there is provided a method of providing information of an apparatus on display in a venue. The method comprises receiving information identifying the apparatus and the venue in which the apparatus is on display from a user device; and generating, by a server, a product information webpage based on the information identifying the apparatus and the venue for providing a recommendation of at least one product to the user device; wherein the information identifying the apparatus and the venue is represented by an image of a machine readable visual representation being displayed on the apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
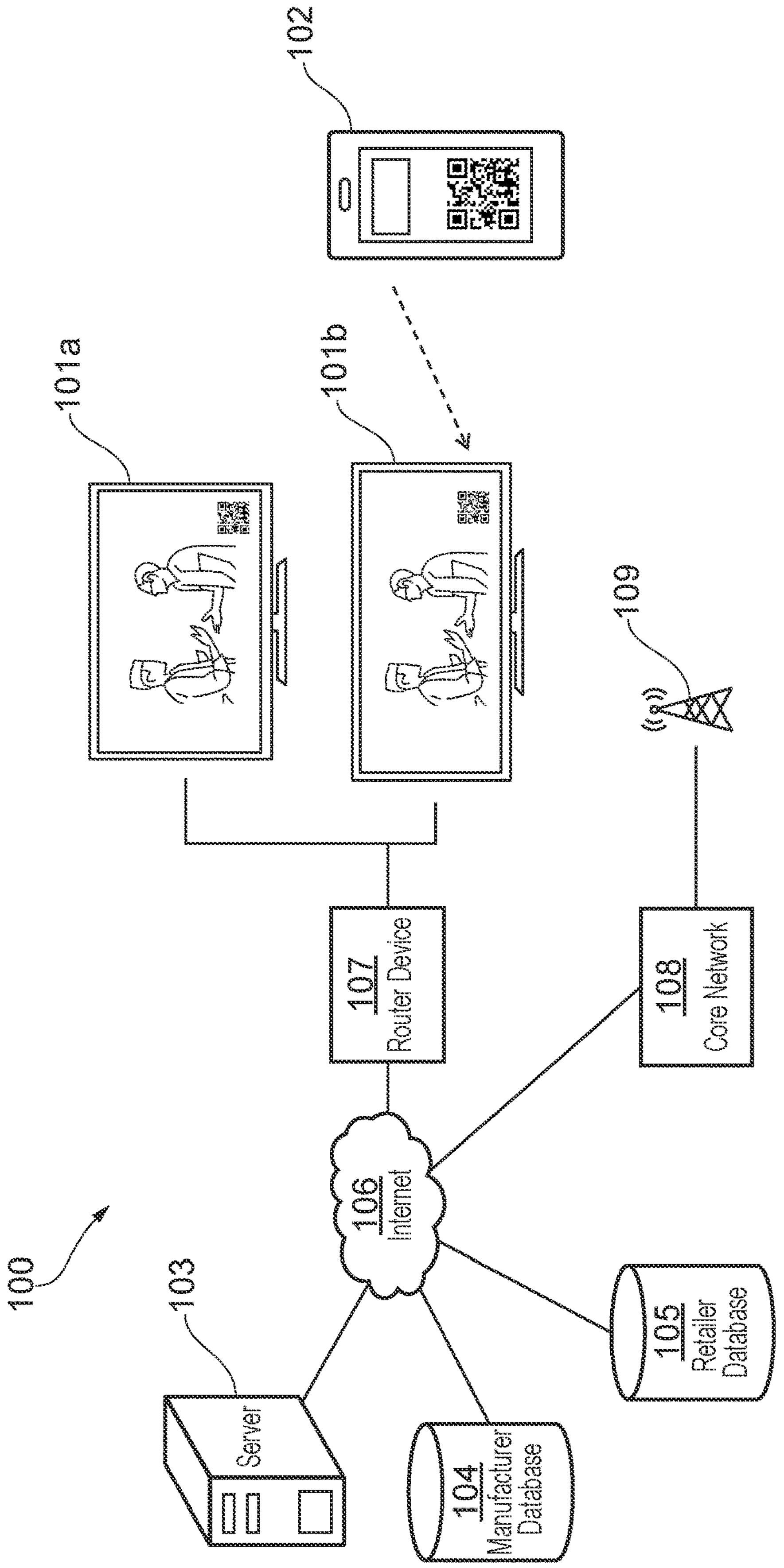
FIG. 1 describes a system for providing information of a product on display in a store according to embodiments of the disclosure.

Referring now to the drawings, wherein like reference numerals designate identical or corresponding parts throughout the several views.

Numerous modifications and variations of the present disclosure are possible in light of the above teachings. It is therefore to be understood that within the scope of the appended claims, the disclosure may be practiced otherwise than as specifically described herein.

The present disclosure provides an information system which allows a user to access the information of an apparatus displayed for sale in a venue such as a retail store, a showroom, or an exhibition hall, in an efficient and convenient manner. According to embodiments of disclosure, the information of the apparatus is provided to the user via a user device, such as a tablet or a mobile phone. The apparatus is equipped with a display device, such as a smart TV, a computer, or a tablet equipped with a screen display, enabling it to exhibit a machine readable visual representation, such as a bar code, a QR code, or a data matrix.

According to embodiments of disclosure, the apparatus can be configured to enter demonstration mode. The demonstration mode is activated through a user interface of the apparatus such as an on screen display settings menu, a touch screen, or a key or a combination thereof on the apparatus or a remote control, to provide demonstration functionality which is not available in normal mode. For example, in the demonstration mode, the apparatus is configured with a special setting designed to optimize the apparatus's display for demonstrating various functional features in a venue such as a retail store, a showroom or an exhibition hall. In the demonstration mode, the apparatus, in embodiments, connects to a server via a network such as the Internet, and provides its model name and serial number to the server. In embodiments, the connection address of the server is part of the configuration of the demonstration mode, for example, it may be hard coded in internal memory at manufacture. In embodiments, the demonstration mode may be configurable and the connection address may be modifiable. Since the time that the apparatus may be available for sale is generally limited to a few years, for convenience the connection address of the server may be fixed. In embodiments, the model name and the serial number are combined to form a unique product ID number. The server is further connected to a retailer database with fields such as model name and serial number of the apparatus, as well as venue ID. The venue ID, such as a store ID, identifies the venue that the apparatus was delivered to and can be retrieved by searching the model name and serial number in the retailer database.

A machine readable visual representation such as a QR code is generated either by the server or the apparatus based on product identity information such as the model name, serial number and store ID. The QR code is then exhibited on the display device of the apparatus. In some embodiments, the QR code is associated with a hyperlink, which outputs a webpage containing product information, such as data related to the model and promotional information associated with the store ID. The web request hyperlink, in embodiments, contains a query string based on parameters such as the model ID or the store ID. For example, the web request hyperlink may take the form of:

"Sony.co.uk/
tvdata.aspx?modelID=xr55a80ju&StoreID=123456"

which creates a webpage providing product information and promotional information for the model "XR55A80JU" at the store with ID "123456". In some other embodiments, the QR code is associated with plain text of the product identity information.

This conveniently provides the user with customised information from the product information and promotional information being stored on the same database. In some embodiments, the customised information is retrieved and compiled from individual data sources, for example, database of the manufacturer and database of the retailer. In some instances, the customised information is pulled from a data source of a particular store in a retail chain, in order to inform the user about promotional offers and stock availability for that particular store. Since only product information and retail shop ID is provided to the server, the user remains anonymous to the manufacturer and the retailer which is advantageous in terms of data protection. In some embodiments the machine readable visual representation is arranged to form a web request hyperlink comprising parameters which are simultaneously used in multiple databases accessible via the internet and populate a webpage accessible to the user device with (i) product information from a first database and (ii) promotional information and (iii) stock information. The stock information may extend to stock information in nearby stores as well as the particular store or details of possible delivery times from a warehouse. In some embodiments the web request hyperlink causes the user device to access a first webpage or location of computer code, the components of which simultaneously integrate and retrieve data from multiple databases to retrieve two or more of product data, promotional data and stock data and arrange the retrieve data into respective portions of a second webpage. The first webpage or location of computer code may open simultaneous connections with the multiple databases. A non-limiting embodiment of a web request hyperlink could be:

"http://website.com/querydb.html?db1=first_db&db1_
query=get_description&db2=second_db&db2_
query=get_promotion"

The address of the first database, first_db, and the address of the second database, second_db, are, in embodiments, entirely referenced in the webpage request hyperlink. In some embodiments, one or more of the database addresses are stored in code components of the webpage. The parameters for the desired description, such as the product model and venue ID may be conveyed in the web request hyperlink. It will be appreciated that more than two database connection requests and database retrievals may similarly be made, if required.

In some embodiments the information identifying the venue in which the apparatus is on display received from a user device do not reveal to the server, information identifying the user or user device.

In some embodiments, the first information is retrieved from a first of the at least two databases and the second information is retrieved from a second database, the first information is derived from the information identifying the apparatus and the second information is derived from information identifying the store and corresponds to promotional information for the store.

Corresponding non-transitory storage medium and server are within the scope of the disclosure.

In some embodiments, a first parameter in the web request hyperlink such as model identifier is queried in a first database, such as a database of the manufacturer, to obtain code components relating to first code information such as product information. In some embodiments, a second parameter such as venue ID in the web request hyperlink is queried in a second database, such as a database of the venue, to obtain code components related to second information such as promotional information corresponding to the venue. In some embodiments, the first parameter is duplicated in the web request hyperlink for the purposes of being searched into the second database, for example to form an AND query with the second parameter. In some embodiments, code components on the web server or in a webpage identified by the web request hyperlink identify the first parameter in the web request query and extract or parse it to be used in querying the second database. Such implementations enable more tailored searches for promotion or stock level information, by for example addressing the second database with an AND query based on model ID and venue ID, thereby deriving the second information based on the first and second parameters.

FIG. 1 is a schematic diagram illustrating a system 100 according to embodiments of the disclosure in which product information is provided to potential buyers for apparatuses 101*a*, 101*b*. The apparatuses 101*a*, 101*b* are, in embodiments, electronic apparatuses equipped with a screen display and capable of displaying images, for example, a smart TV, a personal computer, a laptop, a tablet or a mobile phone, as will be explained later with reference to FIG. 2C. Although FIG. 1 shows only two apparatuses, any number of apparatuses is envisaged.

In embodiments, the system 100 includes a server 103 and a network. Apparatuses 101*a*, 101*b* are connected with the server 103 through the network, such as the Internet 106, via a router device 107. When the apparatuses enter in-store mode or demonstration mode, they send their own product identity information to the server. The server then generates a visual representation based on the product identity information of each apparatus and sends to the corresponding apparatus for being displayed in demonstration mode. The visual representation is, in embodiments, a machine readable code, such as a barcode, a QR code or a data matrix. In some embodiments, the visual representation represents a web request.

According to embodiments of the disclosure, a user launches an application on his or her user device 102 and use it to capture the machine readable code displayed on the apparatus 101*a*. The application then decodes the web request from the machine readable code and sends the web request to the server 103 via the network comprising, for example, a base station 109, a core network 108, and the Internet 106. The server 103 subsequently accesses the manufacturer database 104 and/or retailer database 105 based on the web request and generates a product information webpage which provides product information and promotional information related to the apparatus 101*a* to allow the user to make an informed purchase decision.

Figure 2A:
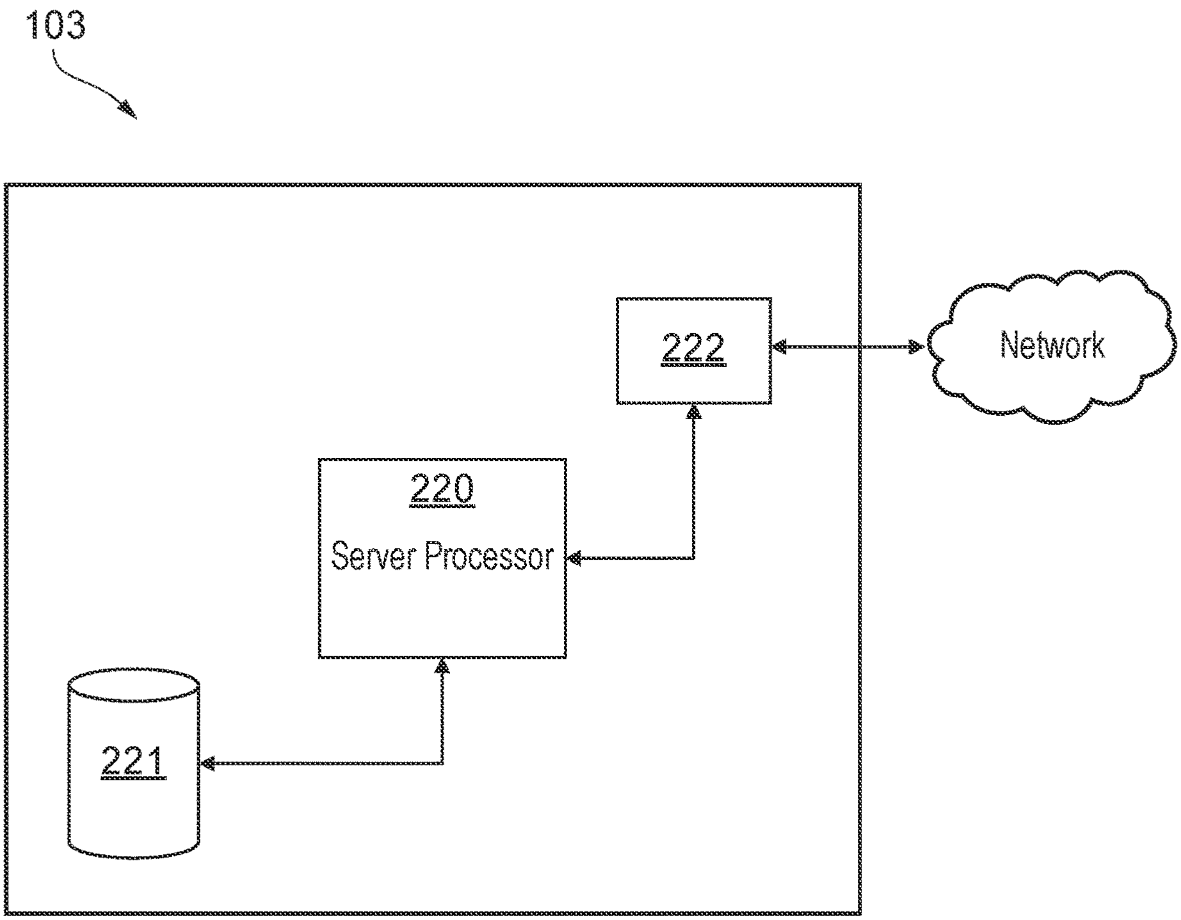
FIG. 2A describes the server of FIG. 1 according to embodiments of the disclosure.

FIG. 2A shows a schematic diagram describing the server 103 according to embodiments of the present disclosure. The server 103 comprises a server processor 220. The server processor 220 is embodied as processing circuitry such as a microprocessor or an Application Specific Integrated Circuit or another circuit design and controls the operation of the server 103 using a computer program which is embodied as software code. The server 103 is controlled by the server processor 220 to perform embodiments of the disclosure. Server storage 221 is connected to the server processor 220 and stores thereon computer-readable instructions which control the server processor 220. In some embodiments, the server storage 221 also includes a manufacturer database and a retailer database. The server storage 221 is, in embodiments, either a magnetically readable storage medium or a solid state storage medium but the disclosure is not limited. For example, the server storage 221 may be located outside of the server and may be connected to the server via a network or may be located on the cloud. The server processor 220, in embodiments, implements a web server in order to generate product information webpages, hence delivering web content containing product information to the user device. In some embodiments, the server processor 220 implements an application server in order to act as a host to enable interaction between server-side application code and an application in the user device for delivery of web content.

Additionally connected to the server processor 220 is server communication circuitry 222. Server communication circuitry 222 connects the server 103 to a network. In embodiments, the network to which server 103 connects via server communication circuitry 205 is a wide area network, such as the Internet, or a Local Area Network (LAN), or the like. The purpose of the server communication circuitry 222 is to send and receive data from various user devices 102 and apparatuses 101 over the network that are explained with reference to FIGS. 2B and 2C.

Figure 2B:
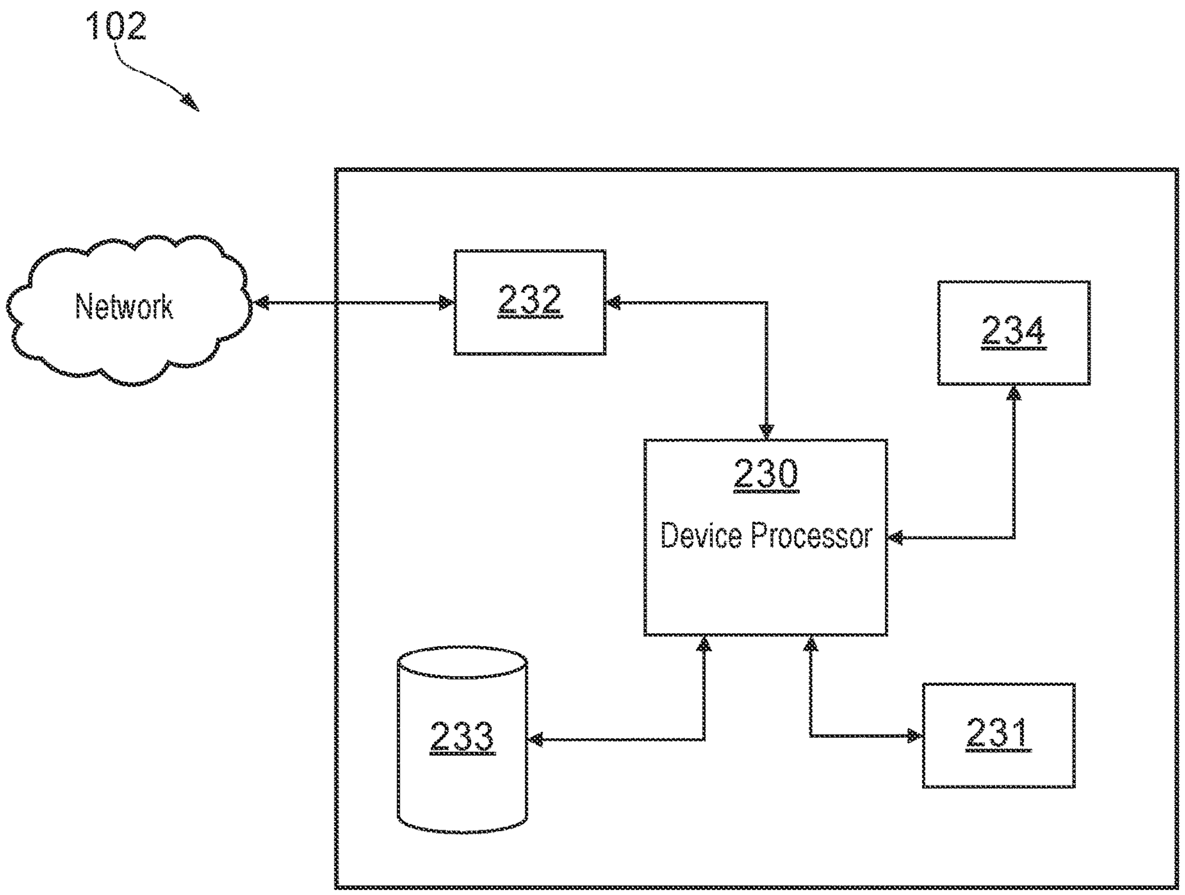
FIG. 2B describes the user device of FIG. 1 according to embodiments of the disclosure.

FIG. 2B shows a schematic diagram describing the user device according to embodiments of the disclosure. The user device 102 is controlled by a device processor 230. The device processor 230 is embodied as a microprocessor, although the disclosure is not so limited and may be an Application Specific Integrated Circuit or other processing circuitry. The device processor 230 operates in accordance with computer readable software code that is located on device storage 233. Device storage 233 is embodied as solid state storage medium, although the disclosure is not so limited and may be a magnetically or optically readable storage medium. Alternatively, device storage 233 may be located remotely to the user device 102 such as being located on the cloud and may be accessible over the internet.

Additionally connected to the device processor 230 is device communication circuitry 232. The purpose of the device communication circuitry 232 is to allow the user device 102 to communicate with another device over a network or in a point-to-point relationship. The device communication circuitry 232 may therefore connect the user device 102 to another user device or the server 103 over a network connection. Specifically, it is envisaged that the user device 102 will be a device that connects to the server 103 over a network such as a Local Area Network or a Wide Area Network.

Additionally connected to device processor 230 is a device interface 231. The purpose of the device interface 231 is to allow a user to interact with the user device 102. For example, a user may wish to interact with the user device 102 using a touch screen. In this case, the device interface 231 is a touch screen such as a capacitive touch screen or a resistive type touch screen.

Finally, image capturing device 234 is connected to device processor 230. In embodiments, the image capturing device 234 is a built-in camera based on CMOS or Charge Coupled Device (CCD) sensor, but the disclosure is not so limited and an external camera or a machine code scanner connected to the user device 102 is envisaged. Specifically, the user device 102 is used to scan or capture a machine readable visual representation such as a bar code, QR code or data matrix using the image capturing device 234.

Figure 2C:
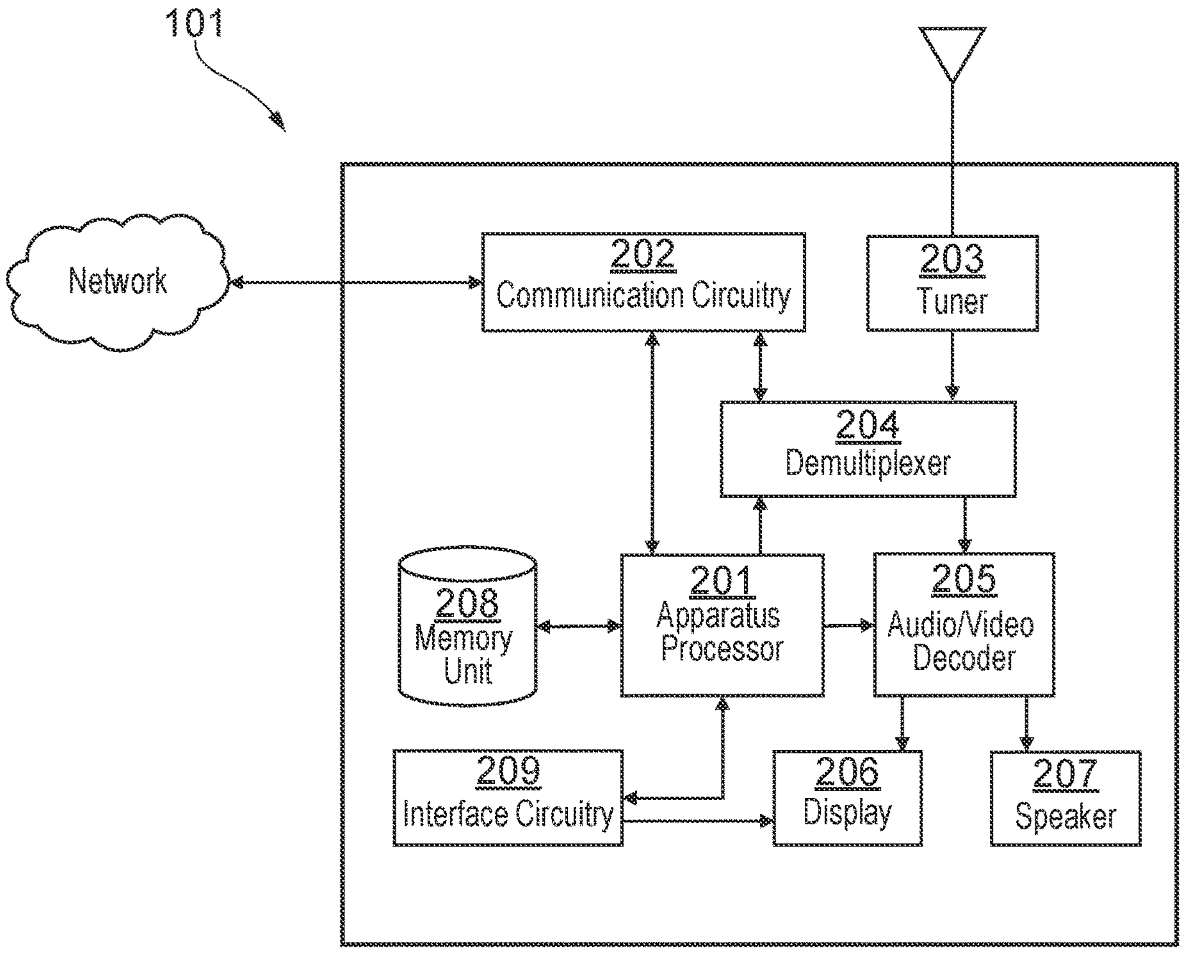
FIG. 2C describes the apparatus of FIG. 1 according to embodiments of the disclosure.

FIG. 2C shows a schematic block diagram illustrating the apparatus 101 according to embodiments of the disclosure. The apparatus 101 comprises an apparatus processor 201. The apparatus processor 201 is embodied as processing circuitry such as a microprocessor or an Application Specific Integrated Circuit or another circuit design and controls the operation of the apparatus 101 using a computer program which is embodied as software code, for example, a receiving software. The apparatus 101 is controlled by the apparatus processor 201 to perform embodiments of the disclosure. A memory unit 208 is connected to the apparatus processor 201 and stores thereon computer-readable instructions which control the apparatus processor 201. According to embodiments of the disclosure, the memory unit 208 also stores product identity information of the apparatus 101 such as model name and product serial number, and a machine readable visual representation received from the server 103, as will be described later with reference to FIGS. 5, 6 and 8.

The apparatus 101, in embodiments, further comprises communication circuitry 202. The communication circuitry 202 includes a network adapter for connecting the apparatus 101 to the network 103, such as a wired-Ethernet adapter or a Wi-Fi network adapter. The network 103 to which the apparatus 101 is connected via the network adapter is a wide area network, such as the Internet, or a local area network, or a combination of a wide area network and a local area network. One purpose of the network adapter is to connect the apparatus 101 to the server 103 over a network connection. Another purpose of the network adapter is to receive from IP servers communication signals containing services, for example, by means of streaming data.

The apparatus 101, in embodiments, further comprises a tuner 203 and a demultiplexer 204. The tuner 203 receives RF signal such as satellite TV signals through the satellite receiver 107, or terrestrial TV or cable TV signals via the TV aerial 210 and converts it to communication signals. The demultiplexer 204 is connected to the apparatus processor 201 and transmits communication signals from the communication circuitry 202 or the tuner 203 to the audio and video decoder 205 based on instructions received from the apparatus processor 201.

Additionally connected to the apparatus processor 201 is an audio and video decoder 205 for obtaining audio signals and video signals from the demultiplexer 204. The audio and video decoder 205 supports various non-limiting audio formats, such as MPEG-1 audio, MPEG-2 audio, AC-3 and Enhanced AC-3 audio, DTS Audio, MPEG-4 AAC, MPEG-4 HE AAC, AC-4, MPEG-H Audio, and DTS-UHD Audio. The audio and video decoder 205 further supports known non-limiting video coding formats, for example, MPEG-2 video, H.264/AVC, MVC, SVC, HEVC and VC-1. In embodiments, the audio and video decoder 205 receives a machine readable visual representation such as a QR code from the apparatus processor 201 and superimposes the image of the QR code over the video source from the demultiplexer 204. Obviously, other image processing technique to simultaneously display the image of the QR code and the video source is envisaged, such as overlaying the QR code image on the video image with a controlled image opacity or transparency. The apparatus 101, in embodiments, further comprise a display 206 and speakers 207 for respectively play back of the video signals and audio signals decoded by the audio and video decoder 205. In embodiments, the display 206 is a built-in screen display on the user device, but the disclosure is not so limited and any display technology such as a projector device is envisaged.

Additionally connected to the apparatus processor 201 is interface circuitry 209. The purpose of the interface circuitry 209 is to display a visual interface in the display 206 and to receive user inputs, such as from a touch screen of the display 206, or from an external control device 210, thereby allowing a user to enter commands to the apparatus 101, or to configure the settings of the apparatus 101.

Figure 3:
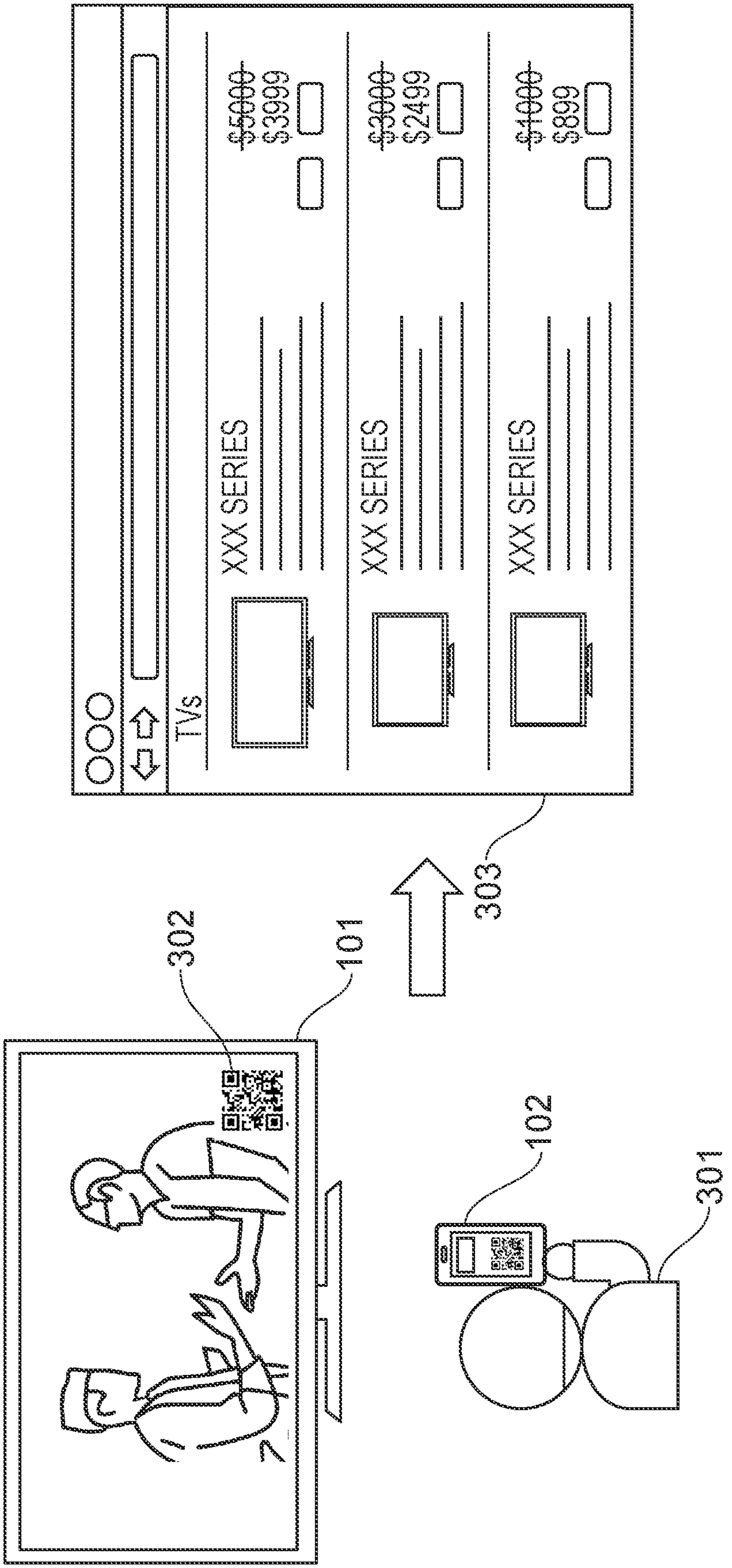
FIG. 3 describes an example scenario in which a user accesses information of an apparatus in the system of FIG. 1 according to embodiments of the disclosure.

FIG. 3 illustrates an example scenario in which a user accesses information of an apparatus on display in the retail information system 100 according to embodiments of the disclosure. A user 301 such as a potential buyer in a venue, such as a retail store, a showroom, or an exhibition hall, may need to obtain product information and promotional information of an apparatus on display in the venue in order to make an informed purchase decision.

In FIG. 3, the user 301 initially comes to a model of an apparatus being displayed for sale in a venue and wants to obtain detailed product information and promotional information with respect to the model. The model is configured as demonstration mode and a machine readable visual representation such as a QR code 302 representing a URI (Uniform Resource Identifier) such as a URL (Uniform Resource Locators) address or a URN (Uniform Resource Name) based on identity information of the model, such as model name, product serial number, and venue location is displayed on the screen of the apparatus. In some embodiments, the machine readable visual representation represents plain text based on the identity information of the apparatus, although the disclosure is not so limited and any representation of the identity information the apparatus (such as encoded text) is envisaged. In some embodiments the machine readable visual representation is a watermark or a forensic mark displayed by multiplexing components of the watermark into the video source. The watermark may directly or indirectly represent data and in a similar way to the QR code represents a URI. A watermark pattern formed by watermark components may be looked up on a remote server to identify a URI.

According to embodiments of the disclosure, an image of the QR code 302 is overlaid on a demonstration video image such that the apparatus can showcase its featured capabilities while the QR code 302 is being displayed. The user launches an application of the manufacturer or the retailer in his or her user device 102, such as a mobile phone or a tablet with a built-in camera. The application prompts the user to capture the QR code 302 exhibited on the model using a built-in camera of the user device 102. The application subsequently decodes the hyperlink or the URI containing the product identity information (such as model name and serial number) and venue identity information (such as venue ID) from the captured QR code 302 and sends a web request to a server of the manufacturer or the retailer through network connection. In another example, the user may capture and decode the QR code 302 using a camera application in the user device 102. The user may then send a web request to the server by accessing the URI using a web browser application.

In embodiments, the server contains a web server for processing the web request, although the disclosure is not so limited and other logic capable of processing the web request (such as an application server) is envisaged. Based on the model identity information contained in the web request, the server runs a server-side script and interact with one or more databases to retrieve product information corresponding to the model, for example, product images, features, benefits, technical specification, product reviews, and the like. Additionally, the server checks the availability of the model by accessing one or more database to retrieve stock information based on the model identity information and venue information in the web request. The server, in embodiments, further makes a query search for promotional offers which are venue-specific from one or more database based on the model identity information and venue information. In some embodiments, the server performs some other computation to generate the content of a product information webpage 303. The product information webpage 303, in embodiments, is formatted as an HTML (HyperText Markup Language) document, although the disclosure is not so limited and creating website using other languages such as PHP (Hypertext Preprocessor), CSS (Cascading Style Sheets), JavaScript, DOM (Document Object Model), JSON (JavaScript Object Notation) or any relevant specification supported by the W3C (World Wide Web Consortium) is envisaged. The application on the user device 102 sending the web request, such as an application of the manufacturer or a browser application, subsequently retrieves the contents of the HTML document from the webserver and displays the product information webpage 303 to the user on the display screen of the user device. In some embodiments, when the application receives the HTML document, it also downloads client-side scripts (such as JavaScript files) that are referenced in the HTML document. The application then executes the client-side script to add interactivity to the product information webpage 303, such as presenting dynamic content or responding to user actions, for example, button clicks to make a purchase order.

According to some embodiments of the disclosure, the product information webpage 303 further provides a questionnaire to gather information from the user such as the budget, product requirements, user interest and needs, in order to make personalized product recommendation. The questionnaire, in embodiments, is designed according to the features of the model, for example, in the case of a television, the questionnaire may ask questions related to the resolution and screen technology, smart TV functionality and connectivity required by the user. In some embodiments, the model on display or the most relevant model to the user interest or needs may be out of stock, the server will search for related models of similar functions and make corresponding recommendation to the user.

In some embodiments, the product model on display may not satisfy all of the user's requirements as indicated in the questionnaire response, the server will search for related models, such as a model in the same product series but with a more suitable screen size, that better fit the user's requirements and make corresponding recommendation to the user.

In some embodiments, the product information webpage 303 further provides a chatbot platform 403 for recommending products to the user based on the model identity information and venue information in the web request. The chatbot, in embodiments, is designed by setting a conversation flow to define the questions and answers that the chatbot may provide based on user input. For example, the chatbot may ask questions from the questionnaire about user interest and needs related to the model in the web request and respond by recommending the most relevant product models.

In some embodiments, the information of the recommended product models is presented in a side-by-side comparison table with the information of the interested model on display.

Figure 4:
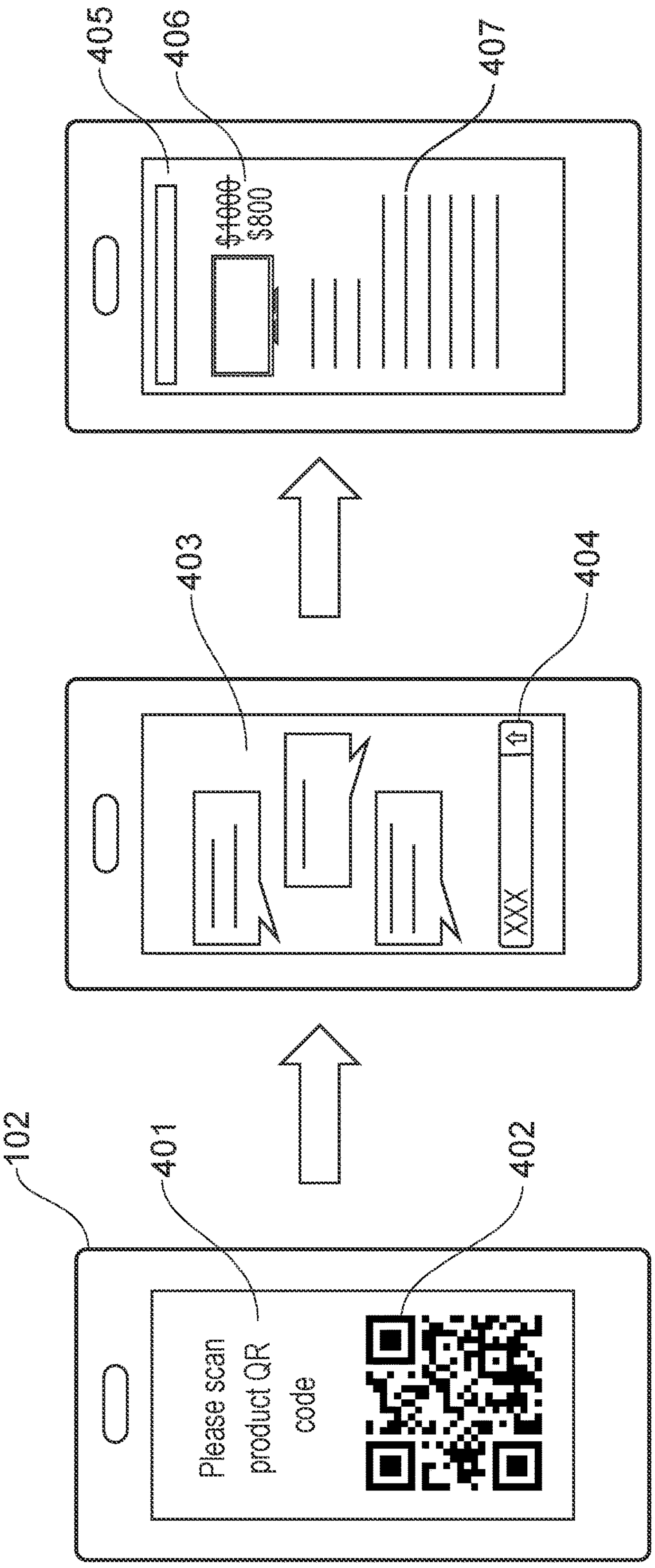
FIG. 4 describes user interfaces of the user device of FIG. 1 for accessing information of an apparatus according to embodiments of the disclosure.

FIG. 4 shows various user interfaces of the user device 102 for providing information of a product on display according to embodiments of the disclosure. When the user approaches a product model on display in the venue, he or she may use an application of the manufacturer or the retailer to enquiry further information about the model. The application, in embodiments, firstly instructs the user device to display a message 401, asking the user to scan the QR code exhibited on the screen of the model. The captured QR code 402 is displayed on the user device for the user to check the image quality. In some embodiments, a further message is displayed on the user device to indicate that the URI in the QR code is successfully decoded. Next, the application enters in the chatbot platform 403, where the chatbot will ask the user certain questions about product requirements, user interest and needs. For instance, the chatbot may ask questions including one or more of the followings:

- What features or specification of the relevant product are most important to the user?
- What is the user's budget for the product?
- What are the intended uses of the product, such as a family TV in the living room, bedroom or dining room?
- What are the warranty policies preferred by the user?
- When will the product required to be delivered?
- Is installation of the product required?

In embodiments, the user responds the questions may entering the answers in the textbox 404. Moreover, it is envisaged that other user interface elements may be used to collect answers from the user, such as a pull down menu interface providing multiple choices, or a drag and drop interface allowing the user to choose among given choices by dragging the suitable choice to the chatbot dialogue. By taking into account the user's answers to these questions, the server can better understand or interpret the customer's needs and provide tailored information and recommendation on a product information page 405 containing promotion information 406 and technical specification 407 that will help the user make an informed purchasing decision.

The chatbot platform 403 can launch a connection to a personnel such as a sales person, who can follow up on the responses and continue the questions about product requirements, user interest and needs. As such the chatbot platform may convert or otherwise be reconfigured into a live chat platform.

Figure 5:
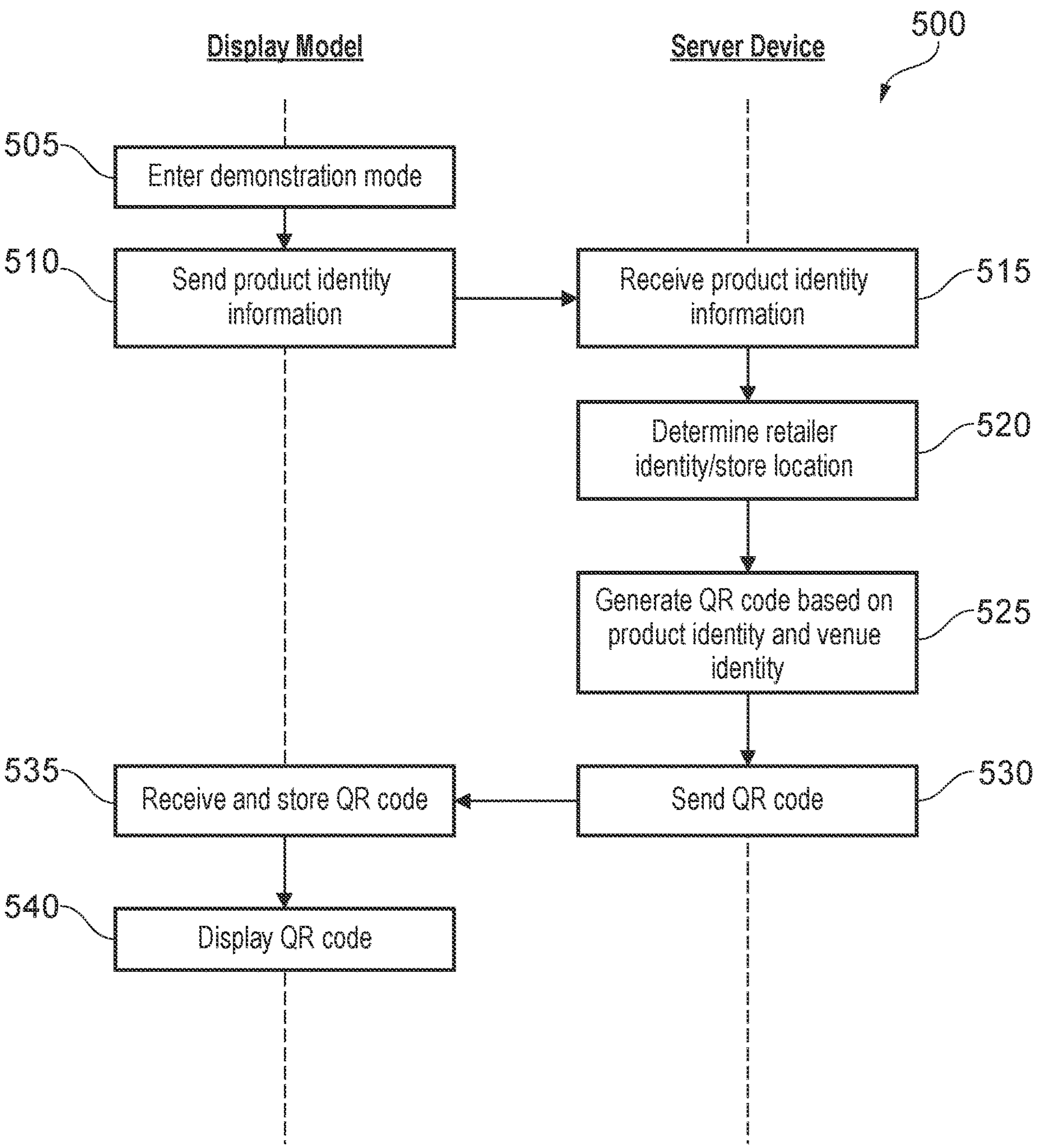
FIG. 5 shows a flow chart describing a process in the system of FIG. 1 for generating a QR code for an apparatus according to embodiments of the disclosure.

FIG. 5 illustrates a flow chart 500 describing a process in the retail information system 100 for generating a QR code associated with a product on display according to embodiments of the disclosure. Process 500 begins at step 505, where the product model on display in a venue is powered on and enters in-store mode or demonstration mode. The demonstration mode, in embodiments, is activated through an On Screen Display (OSD) settings menu by a user interface such as command buttons on the product or a remote control, or a predetermined sequence of button presses on the product or a remote control. During the demonstration mode, a short demonstration video clip may be played on loop on the display of the product to showcase the product's capabilities such as enhanced brightness, contrast, and colour saturation, as well as advanced features like motion smoothing and edge enhancement of the display to create a more eye-catching and attractive visual display to potential buyers.

At step 510, the product on display reads product identity information such as model name and product serial number from its internal memory. The product then connects with a server on a network, such as the Internet, through the network interface circuitry. Once the connection is successfully established, the product sends the product identity information to the server based on a communication protocol such as the Transmission Control Protocol/Internet Protocol (TCP/IP).

At step 515, the server receives product identity information from the product on display. The server in embodiments, implements an authentication process to verify the identity of the product, for example, prompting a retail store or showroom staff to enter a PIN (Personal identification Number) code. In some embodiments, the manufacturer maintains a product registration database for tracking the sale and distribution of products. Based on the product serial number received from the product and the PIN code entered by the retail store staff, it can also be determined from the product registration database whether the relevant product is a genuine product made by the manufacturer.

At step 520, the server accesses a retailer database based on the product identity information received from the product on display and make a query search for the identity information of the venue, such as a venue ID code, where the product is on display. In some embodiments, the venue information is manually entered by the retail store staff through the user interface of the product and sent to the server.

At step 525, the server generates a machine readable visual representation such as a bar code, a QR code, or a data matrix, based on the product identity information received from the product in step 515 and the venue identity information determined in step 520. The machine readable visual representation, in embodiments, represents a web request, such as a hyperlink or a URI, for requesting product information from the server, such as technical specification related to the model name and promotional information associated with the retailer or store. The web request hyperlink, in embodiments, contains a query string based on parameters such as the model ID or the venue ID. For example, the web request hyperlink. For example, the web request hyperlink may take the form of:

"Sony.co.uk/
tvdata.aspx?modelID=xr55a80ju&StoreID=123456"

The server will then create a webpage to provide product information and promotional information for the model XR55A80JU at the venue with ID 123456. In some other embodiments, the machine readable visual representation is associated with plain text based on the product identity information, although the disclosure is not so limited and any representation of the identity information the apparatus (such as encoded text) is envisaged.

The process then moves to step 530, where the server sends the machine readable visual representation, such as a QR code generated in step 525 to the product on display through network connection. The communication between the server and the product, in embodiments, is conducted based on a communication protocol such as TCP/IP.

At step 535, the product configured in demonstration mode, receives the QR code from the server and stores it in its internal memory. In some embodiments, in the situation where network connection is not available, the user may operate the product to generate the QR code locally based on product identity information saved in internal memory and manually input venue identity information.

At step 540, the product displays the QR code on its screen display to allow a potential customer to scan the QR code using his or her user device. In some embodiments, the image of the QR code superimposes on a demonstration video image such that the product can showcase its featured capabilities while the QR code is being displayed. Obviously, other image processing technique to simultaneously display the image of the QR code and the video source is envisaged, such as overlaying the QR code image on the video image with a controlled image opacity or transparency.

Figure 6:
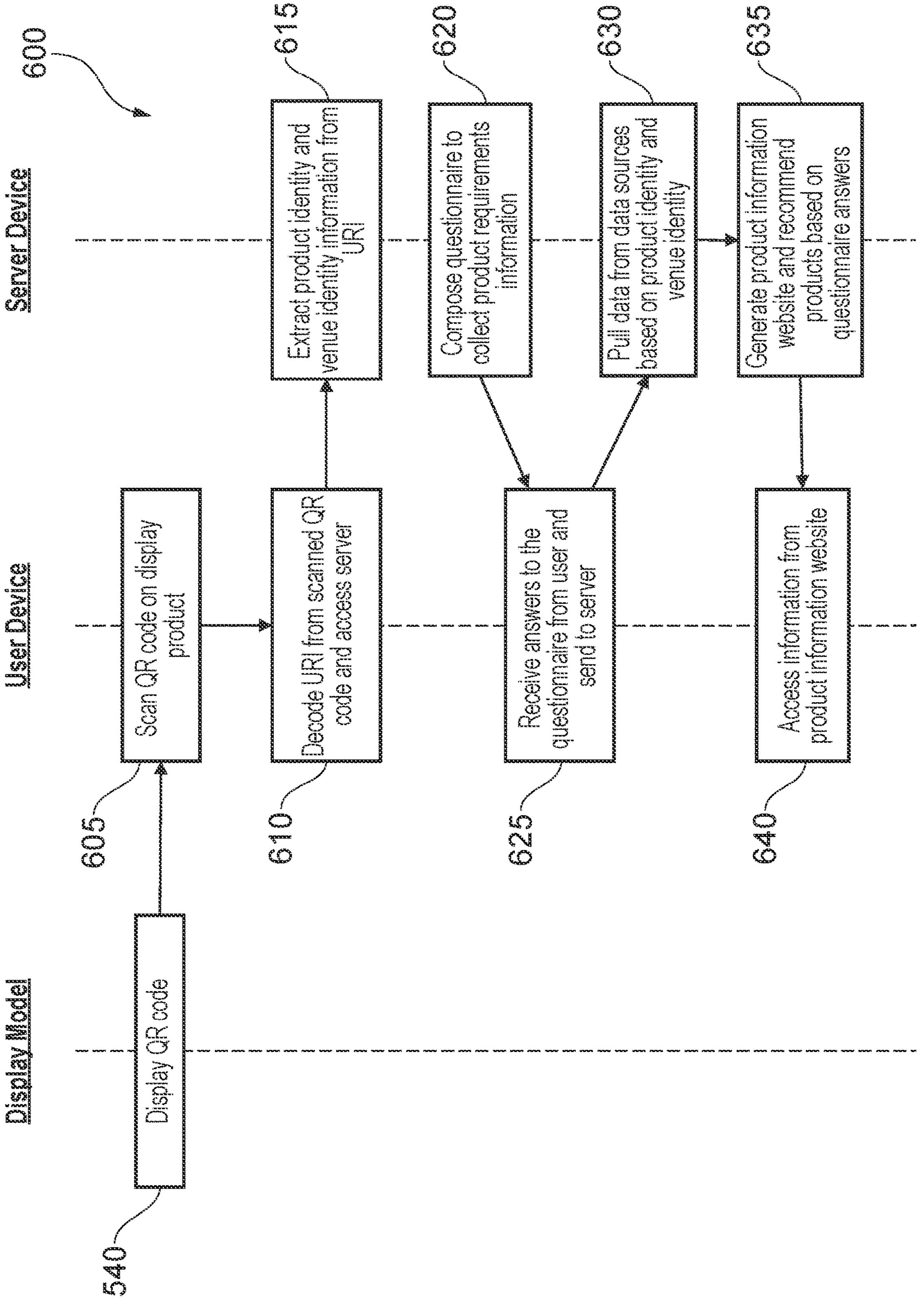
FIG. 6 shows a flow chart describing a process in the system of FIG. 1 for providing information of an apparatus based on a displayed QR code according to embodiments of the disclosure.

FIG. 6 illustrates a flow chart 600 describing a process in the retail information system 100 for providing product information based on a QR code shown on a display screen according to embodiments of the disclosure. Process 600 follows the step 540 in FIG. 5, where a QR code containing a web request, such as a hyperlink or a URI, for providing product information is displayed on the product display screen.

The process proceeds to step 605 where a user such as a potential buyer approaches the product in the venue such as a retail store, a showroom, or an exhibition hall. The user scans the QR code shown on the product display screen using an application from the manufacturer or the retailer installed on a user device with a built-in camera, such as a tablet or a mobile phone.

At step 610, the application on the user device decodes the hyperlink or the URI from the scanned QR code. The application then connects with the server of the manufacturer or the retailer through network connection such as the internet and sends a web request to the server based on the URI. In some embodiments, the user may capture and decode the QR code using a camera application in the user device. The camera application then decodes the URIs from the QR code and present it to the user. The user may send a web request by clicking on the URI in the camera application. In some embodiments, the image of the machine readable representation such as a watermark pattern formed by watermark components is sent to the server.

At step 615, the server extracts product identity and venue identity information from the web request received from the user device. In some embodiments, only the product identity information such as a product serial number is provided in the scanned QR code. In such case, the server can still look up the retailer data source to reveal the location of the venue where the product is being displayed. In some embodiments, the QR Code information is augmented with location information provided by the user device, based on for example GNNS (Global Navigation Satellite System), indoor positioning signals provided by positioning circuitry in the user device, or positioning information from the local Wi-Fi network of the venue if the user device is connected to the Wi-Fi network. The location information contained in the QR code information is particularly advantageous as it can be used as a double-check that the store identity information correlates and that appropriate promotional offer information is received.

In some embodiments where the image of the machine readable representation such as a watermark pattern is sent to the server, the server look up a remote serve to identify a URI.

At step 620, the server, in embodiments, composes a questionnaire based on the product identity information extracted from the web request, to gather information from the user related to the budget, product requirements, user interest and needs, in order to make tailored recommendation. In some embodiments, the server retrieves a preset questionnaire from memory or a data source. The questionnaire, in embodiments, is designed according to the features of the model, for example, in the case of a television, the questionnaire may ask questions related to the resolution and screen technology, smart TV functionality, accessibility features and connectivity required by the user. The questionnaire is then sent to the user device to obtain responses from the user.

At step 625, the user device presents the questionnaire in the application such as a manufacturer or retailer application, or a browser application to collect feedback from the user. The user device then sends the user feedback to the server. In some embodiments, the application further provides a chatbot for asking the questions in the questionnaire, thereby making recommendations of the product models based on the interest and needs stated in the user's answers. In embodiments, the chatbot platform 403 captures audio responses, speech-to-text convert them and populate answers to the questionnaire. In embodiments, the chatbot may request the user to input free text or speak their requirements for a television, categorise the response and arrange it into answers to the questionnaire.

At step 630, the server pulls data from various data sources such as databases of the manufacturer and retailer based on information including product identity, venue identity, and user feedback to the questionnaire. In some embodiments, the server acquires data by accessing another server which has captured data from various data sources, for example, by regularly interrogating various servers via an API to obtain information on stock, and promotional offers from one or more retailer websites.

At step 635, the server generates a product information webpage to provide a recommendation of the most relevant products based on user feedback to the questionnaire. The product information webpage, in embodiments, is formatted in a similar manner as described in step 303 of FIG. 3. In some embodiments, the most relevant model to the user interest or needs may be out of stock, the server will then search for related models of similar functions and make corresponding recommendation to the user. In some embodiments, the product model on display may not satisfy all of the user's requirements as indicated in the questionnaire response, the server will then search for related models, such as a model in the same product series but with a more suitable screen size, that better fit the user's requirements and make corresponding recommendation to the user.

At step 640, the user device accesses the product information webpage and displays the webpage contents on the display screen, in order to assist the user to make an informed purchase decision.

In such a way, embodiments of the disclosure enable a user to obtain personalized product information anonymously based on a model on display in the venue. Product information such as technical specification in the required level of details, updated promotional offers, and stock availability can be presented in an attractive and interactive manner to assist the user to make an informed purchase decision. The embodiments of the disclosure also provide the advantage of scalability such that the server can handle large volume user requests from different venues simultaneously. Improved user experience is therefore achieved by making the product enquiry and recommendation process more efficient, accessible and relevant. The use of machine readable code to access product information also ensures accuracy of the process by eliminating input errors if the user were to enter the product identity information manually via a user interface.

Figure 7:
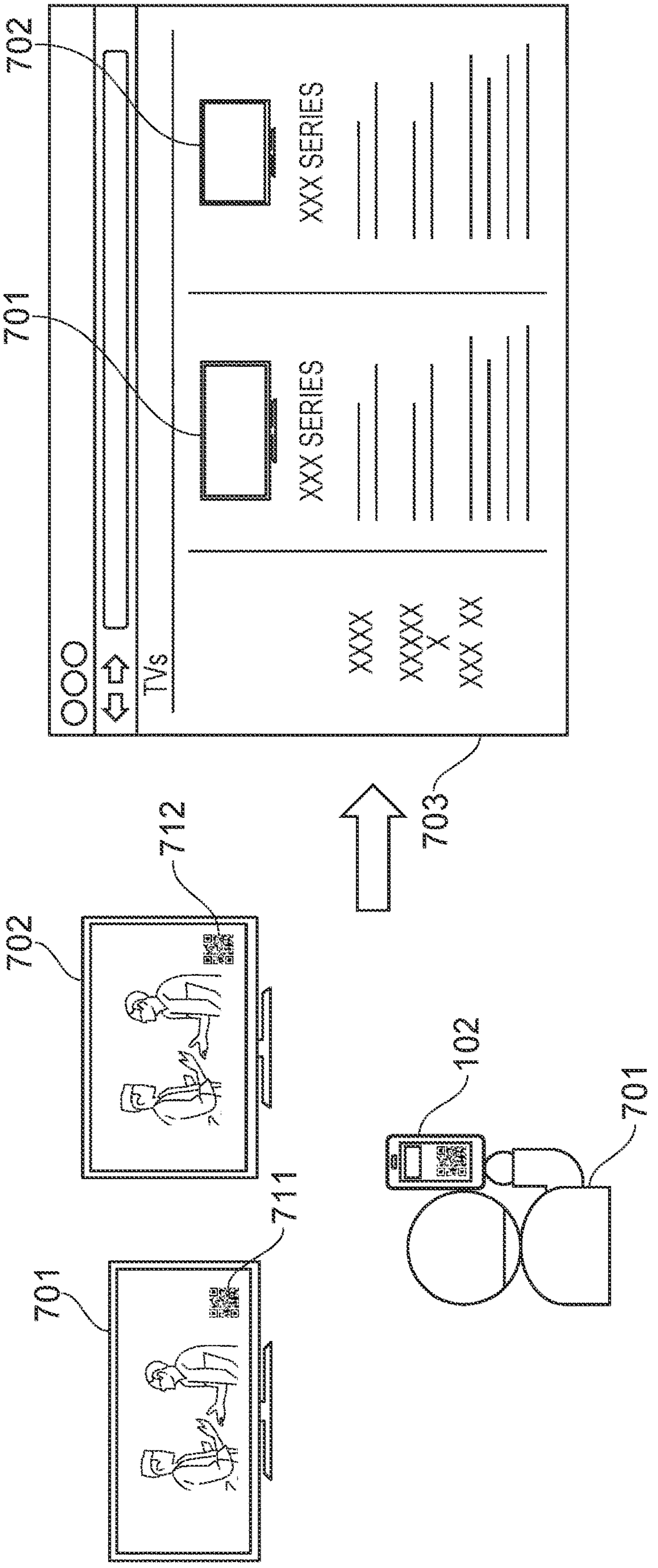
FIG. 7 describes another example scenario in which a user accesses information of multiple apparatuses in the system of FIG. 1 according to embodiments of the disclosure.

FIG. 7 illustrates another example scenario in which a user accesses information of multiple products on display in the retail information system 100 according to embodiments of the disclosure. A user 701 such as a potential buyer interested in various models of an apparatus, such as a television, being displayed in a venue, for example a retail store, a showroom, or an exhibition hall, may need to compare the product features and promotional offers related to the different models.

In FIG. 7, the user 701 approaches the interested models 701 and 702 of the apparatus being displayed for sale in the venue. Both models 701, 702 are configured as demonstration mode and machine readable visual representation such as QR codes 711 and 712 are respectively displayed on the screen of the corresponding models 701, 702. The QR code, in embodiments, represent a URI address based on identity information of the model, such as model name, serial number, and venue location. In some embodiments, the machine readable visual representation represents plain text based on the identity information of the model, although the disclosure is not so limited and any representation of the identity information the apparatus (such as encoded text) is envisaged.

According to embodiments of the disclosure, the image of the QR codes 711 and 712 superimpose on a demonstration video image such that the apparatus can showcase its featured capabilities while the QR codes 711 and 712 are being displayed. Obviously, other image processing technique to simultaneously display the image of the QR codes and the video source is envisaged, such as overlaying the QR code image on the video image with a controlled image opacity or transparency. The user opens an application of the manufacturer or the retailer in his or her user device 102, such as a mobile phone or a tablet with a built-in camera. The application prompts the user to capture the QR codes 711 and 712 in turn in order to make a product comparison. The application subsequently decodes the hyperlink or the URI containing the model identity information and venue information from the captured QR codes 711 and 712, and sends a web request to a server of the manufacturer or the retailer through network connection.

In embodiments, the server contains a web server for processing the web request, although the disclosure is not so limited and other logic capable of processing the web request (such as an application server) is envisaged. Based on the information of the two models contained in the web request, the server runs a server-side script and interact with one or more database to retrieve product information corresponding to the two models, for example, product images, features, benefits, technical specification, product reviews, and the like. The product information of the two models are then compared side by side in the product comparison webpage 703. Additionally, the server checks the availability of the two models by accessing one or more database to retrieve stock information based on the model identity information and venue information in the web request. The server, in embodiments, further makes a query search for promotional offers which are venue-specific from one or more database based on the information of the two models and venue location. In some embodiments, the server performs some other computation to generate the content of a product comparison webpage 703. The product comparison webpage 703, in embodiments, takes the form of a comparison table and is formatted in a similar manner as described in step 303 of FIG. 3. The application on the user device 102 such as an application of the manufacturer or retailer subsequently retrieves the contents of the HTML document from the webserver and displays the product comparison webpage 703 to the user on the display screen of the user device. In some embodiments, the application also downloads client-side scripts (such as JavaScript files) that are referenced in the HTML document. The application then executes the client-side script to add interactivity to the product comparison webpage 703, such as presenting dynamic content or responding to user actions, for example, button clicks to make a purchase order.

According to some embodiments of the disclosure, the product comparison webpage 703 further provides a questionnaire to gather information from the user such as the budget, product requirements, user interest and needs, in order to make personalized product recommendation. The questionnaire, in embodiments, is designed according to the features of the two models, for example, in the case of a television, the questionnaire may ask questions related to the resolution and screen technology, smart TV functionality and connectivity required by the user. In some embodiments, the most relevant model to the user interest or needs may be out of stock, the server will search for related models of similar functions and make corresponding recommendation to the user. In some embodiments, the product model on display may not satisfy all of the user's requirements as indicated in the questionnaire response, the server will then search for related models, such as a model in the same product series but with a more suitable screen size, that better fit the user's requirements and make corresponding recommendation to the user.

In some embodiments, the product comparison webpage 703 further provides a chatbot platform 403 for recommending products to the user based on the information of the two models and venue information in the web request. The chatbot, in embodiments, is designed by setting the conversation flow that defines the questions and answers that the chatbot may provide based on user input. For example, the chatbot may ask questions from a questionnaire about user interest and needs related to the models in the web request and respond by recommending the relevant product models. The information of the recommended product models is presented in a side-by-side comparison table with the information of the two interested models 701, 702 on display. Although FIG. 7 shows only two interested models, any number of models would make a comprehensible product comparison is envisaged.

Figure 8:
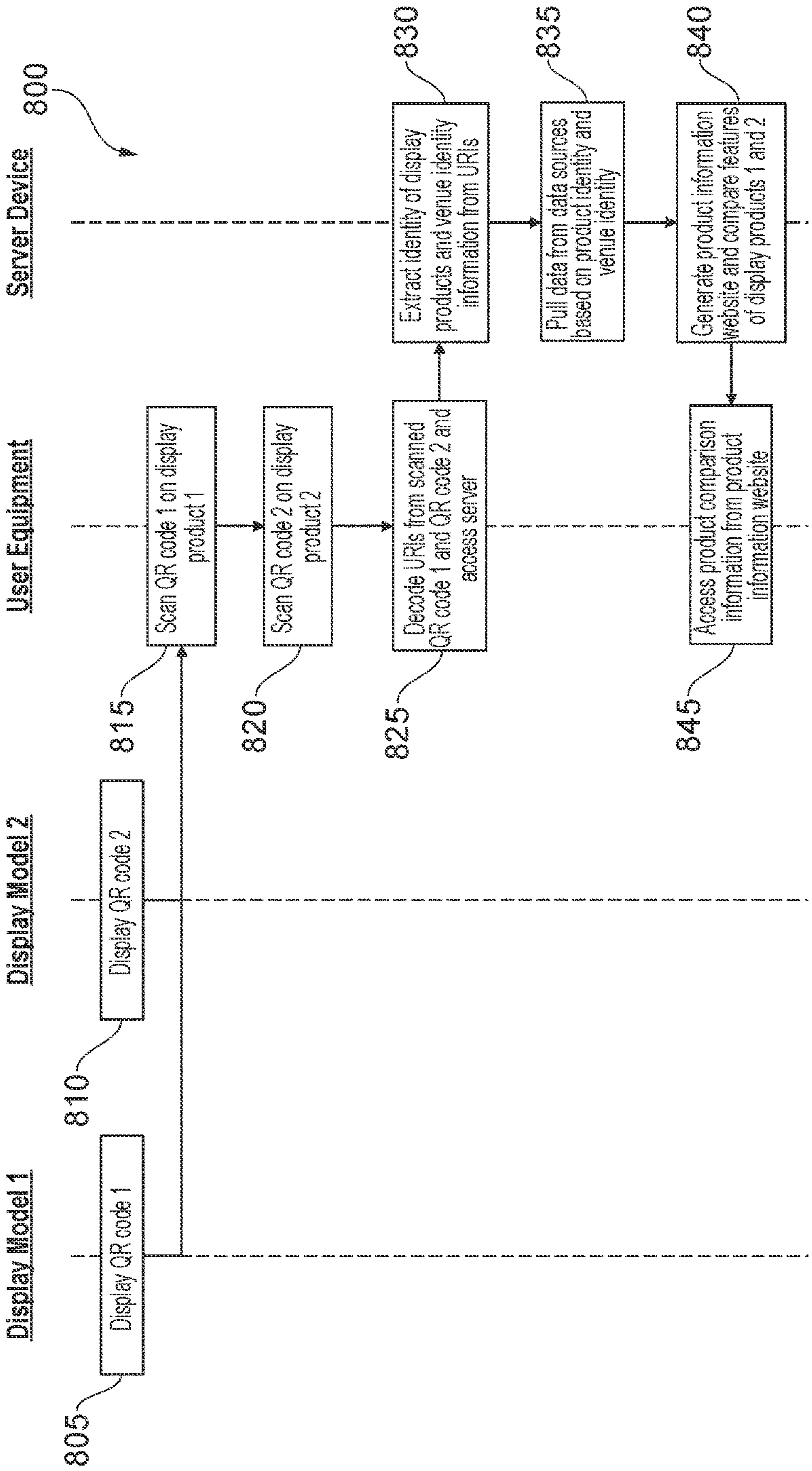
FIG. 8 shows a flow chart describing a process in the system of FIG. 1 for providing comparison information of multiple apparatuses based on displayed QR codes according to some embodiments of the disclosure.

FIG. 8 shows a flow chart describing a process in the retail information system 100 for providing comparison information of multiple products on display based on displayed QR codes according to some embodiments of the disclosure. Process 800 begins with the steps 805 and 810, where QR codes containing a web request, such as a hyperlink or a URI, for providing product information are respectively displayed on the display screen of model 1 and model 2.

The process proceeds to steps 815 and 820 where a user such as a potential buyer approaches the two models in the venue, such as a retail store, a showroom, or an exhibition hall. The user scans QR code 1 and QR code 2 respectively shown on the display screen of the two models using an application from the manufacturer or the retailer installed on a user device with a built-in camera, such as a tablet or a mobile phone.

At step 825, the application on the user device decodes the corresponding URIs from the scanned QR code 1 and QR code 2, and extract the product identity information of model 1 and model 2 from the QR codes. Next, the application compiles a new web request such as a new URI encompassing the identity information of both models. The application then connects with the server of the manufacturer or the retailer through the network such as the internet and sends the new web request to the server.

At step 830, the server extracts product identity of the two models and venue identity information from the new web request received from the user device. In some embodiments, only the product identity information such as a product serial number is provided in the scanned QR code. In such case, the server can still look up the retailer data source to reveal the location of the venue where the product is being displayed.

At step 835, the server pulls data from various data sources such as databases of the manufacturer and retailer based on information including product identity of the two models and venue identity.

At step 840, the server generates a product comparison webpage 703 to provide a comparison of the two models. The product comparison webpage 703, in embodiments, provides a side-by-side comparison of the corresponding product specification and promotional information based on the data pulled from various data sources. In some embodiments, a model to the user interest or needs may be out of stock, the server will then search for related models of similar functions and make corresponding recommendation to the user.

At step 845, the user device accesses the product comparison webpage 703 and displays the webpage contents on the display screen in order to assist the user to make an informed purchase decision.

In such a way, embodiments of the disclosure enable a user to obtain personalized product information anonymously based on multiple models on display in the venue. Product information such as technical specification in the required level of details, updated promotional offers, and stock availability can be presented in an attractive and interactive manner to assist the user to make an informed purchase decision. The embodiments of the disclosure also provide the advantage of scalability such that the server can handle a large volume user requests from different venues simultaneously. Improved user experience is therefore achieved by making the product enquiry and recommendation process more efficient, accessible and relevant. The use of machine-readable code to obtain product comparison information also ensures accuracy of the process by eliminating input errors if the user were to enter the product identity information manually via a user interface.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent embodiments of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors. The different units, circuitry and/or processors may be physically distributed across any distance. The disclosed embodiments may also be implemented based on processing and storage units located in a remote system, such as in the Cloud.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally be described by the following numbered clauses:

1. A method of providing information of an apparatus on display in a venue, receiving information identifying the apparatus and the venue in which the apparatus is on display from a user device; and generating, by a server, a product information webpage based on the information identifying the apparatus and the venue for providing a recommendation of at least one product to the user device;

wherein the information identifying the apparatus and the venue is represented by an image of a machine readable visual representation being displayed on the apparatus.

2. The method according to clause 1, further comprising the steps of:

acquiring the information identifying the apparatus and the venue in which the apparatus is on display from the apparatus;

generating by the server the machine readable visual representation based on the acquired information; and transmitting the machine readable visual representation to the apparatus on display.

3. The method according to clause 2, wherein the step of generating the machine readable visual representation further comprises encrypting the acquired information.

4. The method according to clause 1, wherein the product information webpage comprises first information and second information respectively retrieved from a first database and a second database, and wherein the first information is derived at least from information identifying the apparatus and the second information is derived at least from information identifying the venue.

5. The method according to clause 4, wherein the first information comprises product data of the recommended product; and wherein the second information comprises at least one of promotional information and stock information of the recommended product.

6. The method according to clause 1, wherein the information received from the user device do not reveal information identifying the user or the user device.

7. The method according to clause 1, wherein the product information webpage further comprises information of products related to the recommended product.

8. The method according to clause 1, further comprising the steps of:

checking availability of the recommended product based on the information identifying the venue; and providing a recommendation of products similar to the recommended product in the product information webpage in the event that the recommended product is not available.

9. The method according to clause 1, wherein the product information webpage comprises an interface element for enquiring the user about product requirements; and the recommendation of at least one product is determined based on the user's responses to the enquiry.

10. The method according to clause 9, wherein the interface element is a chatbot platform performing a questionnaire; or wherein the interface element launches, based on the user's responses to the enquiry, a connection to a personnel to follow up on the responses.

11. The method according to clause 1, wherein the machine readable visual representation is displayed on the display device when the apparatus on display is in a demonstration mode, and wherein the demonstration mode is activated through a user interface of the apparatus, and performs demonstration functionality not available in a normal mode of the apparatus.

12. The method according to clause 1, wherein the machine readable visual representation is overlaid on a demonstration screen of the apparatus on display.

13. The method according to clause 1, wherein the apparatus on display is a video service reception apparatus.

14. A computer program product comprising computer readable instructions which, when loaded onto a computer, configure the computer to perform a method according to any preceding clause.

15. A server, comprising circuitry configured to:

receive information identifying an apparatus and a venue in which the apparatus is on display from a user device; and generate a product information webpage based on the information identifying the apparatus and the venue for providing a recommendation of at least one product to the user device;

wherein the information identifying the apparatus and the venue is represented by an image of a machine readable visual representation being displayed on the apparatus.

16. The server according to clause 15, wherein the circuitry is further configured to:

acquire the information identifying the apparatus and the venue in which the apparatus is on display from the apparatus;

generate the machine readable visual representation based on the acquired information; and transmit the machine readable visual representation to the apparatus on display.

17. The server according to clause 16, wherein the generating the machine readable visual representation further comprises encrypting the acquired information.

18. The server according to clause 15, wherein the product information webpage comprises first information and second information respectively retrieved from a first database and a second database, and wherein the first information is derived at least from information identifying the apparatus and the second information is derived at least from information identifying the venue.

19. The server according to clause 18, wherein the first information comprises product data of the recommended product; and wherein the second information comprises at least one of promotional information and stock information of the recommended product.

20. The server according to clause 15, wherein the circuitry is further configured to:

check availability of the recommended product based on the information identifying the venue; and provide a recommendation of products similar to the recommended product in the product information webpage in the event that the recommended product is not available.

21. The server according to clause 15, wherein:

the product information webpage comprises an interface element for enquiring the user about product requirements; and the recommendation of at least one product is determined based on the user's responses to the enquiry.

22. The server according to clause 21, wherein the interface element launches, based on the user's responses to the enquiry, a connection to a personnel to follow up on the responses.

23. The server according to clause 15, wherein the machine readable visual representation is displayed on the display device when the apparatus on display is in a demonstration mode, and wherein the demonstration mode is activated through a user interface of the apparatus, and performs demonstration functionality not available in a normal mode of the apparatus.

24. The server according to clause 15, wherein the machine readable visual representation is overlaid on a demonstration screen of the apparatus on display.

25. The server according to clause 15, wherein the apparatus on display is a video service reception apparatus.

26. An apparatus, comprising circuitry configured to:

send, to a server, information identifying the apparatus and the venue in which the apparatus is on display; and receive a machine readable visual representation generated by the server based on the information identifying the apparatus and the venue; and the apparatus further comprising:

a display device for displaying the machine readable visual representation.

27. A method of providing first and second information of an apparatus on display in a venue, comprising:

receiving information identifying the apparatus and the venue in which the apparatus is on display from a user device; and generating, by a server, a webpage based on the information identifying the apparatus and the venue for providing the first and the second information to the user device;

wherein the information identifying the apparatus and the venue is represented by an image of a machine readable visual representation being displayed on the apparatus on display, and the machine readable visual representation comprises data identifying at least two databases accessible by the server.

What is claimed is:

1. A method of providing information regarding an electronic apparatus having a display, the electronic apparatus being a demonstration model present at a venue, receiving, by a server, a second instance of information identifying the electronic apparatus and the venue in which the electronic apparatus is present from a user device; and generating, by the server, a product information webpage based on the information identifying the electronic apparatus and the venue for providing a recommendation of at least one product to the user device;

wherein the second instance of information identifying the electronic apparatus and the venue is represented in a machine readable visual representation displayed on the display of the electronic apparatus that is imaged by the user device, wherein the product information webpage comprises a chatbot platform for enquiring the user about product requirements, the enquiry comprising at least one step of dialogue, wherein the at least one step of dialogue comprises a chatbot from the chatbot platform asking a question to a user and the user responding, and the recommendation of at least one product is determined based on the user's responses to the enquiry;

wherein the method further comprises, by the server, the steps of:

acquiring a first instance of information identifying the electronic apparatus and the venue in which the electronic apparatus is present from the electronic apparatus;

implementing an authentication process to verify an identity of the electronic apparatus;

upon successful authentication of the electronic apparatus, generating the machine readable visual representation based on the acquired first instance of the information; and transmitting the machine readable visual representation to the electronic apparatus.

2. The method according to claim 1, wherein the step of generating the machine readable visual representation further comprises encrypting the acquired information.

3. The method according to claim 1, wherein the product information webpage comprises first information and second information respectively retrieved from a first database and a second database, and wherein the first information is derived at least from information identifying the electronic apparatus and the second information is derived at least from information identifying the venue.

4. The method according to claim 3, wherein the first information comprises product data of the recommended product; and wherein the second information comprises at least one of promotional information and stock information of the recommended product.

5. The method according to claim 1, wherein the information received from the user device do not reveal information identifying the user or the user device.

6. The method according to claim 1, wherein the product information webpage further comprises information of products related to the recommended product.

7. The method according to claim 1, further comprising the steps of:

checking availability of the recommended product based on the information identifying the venue; and providing a recommendation of products similar to the recommended product in the product information webpage in the event that the recommended product is not available.

8. The method according to claim 1, wherein the chatbot performs at least two steps of dialogue in the style of a questionnaire.

9. The method according to claim 1, wherein the machine readable visual representation is displayed on the display device when the electronic apparatus on display is in a demonstration mode, and wherein the demonstration mode is activated through a user interface of the electronic apparatus, and performs demonstration functionality not available in a normal mode of the electronic apparatus.

10. The method according to claim 1, wherein the machine readable visual representation is overlaid on a demonstration screen of the electronic apparatus on display.

11. The method according to claim 1, wherein the electronic apparatus on display is a video service reception apparatus.

12. A non-transitory computer readable storage medium comprising computer readable instructions that, when executed by a computer, cause the computer to perform the method according to claim 1.

13. The method according to claim 1, wherein after at least two steps of dialogue with the second dialogue response being contingent on a dialogue response to the first step of dialogue, the chatbot platform launches, based on the user's response to the enquiry, a connection to a personnel to follow up the responses.

14. The method according to claim 1, wherein the user responds to the question asked by the chatbot with an audio response and the chatbot converts the response through speech-to-text.

15. A server, comprising circuitry configured to:

receive a second instance of information identifying an electronic apparatus having a display and a venue in which the electronic apparatus is present from a user device; and generate a product information webpage based on the second instance of information identifying the electronic apparatus and the venue for providing a recommendation of at least one product to the user device;

wherein the second instance of information identifying the electronic apparatus and the venue is represented in a machine readable visual representation being displayed on the display of the electronic apparatus that is imaged by the user device, wherein the product information webpage comprises a chatbot platform for enquiring the user about product requirements, the enquiry comprising at least one step dialogue, wherein one step of dialogue comprises a chatbot asking a question to a user and the user responding, and the recommendation of at least one product is determined based on the user's responses to the enquiry, wherein the circuitry is further configured to:

acquire a first instance of information identifying the electronic apparatus and the venue in which the electronic apparatus is present from the electronic apparatus;

implement an authentication process to verify an identity of the electronic apparatus;

upon successful authentication of the electronic apparatus, generate the machine readable visual representation based on the acquired first instance of the information; and transmit the machine readable visual representation to the electronic apparatus.

16. The server according to claim 15, wherein the generating the machine readable visual representation further comprises encrypting the acquired information.

17. The server according to claim 15, wherein the product information webpage comprises first information and second information respectively retrieved from a first database and a second database; wherein the first information is derived at least from information identifying the electronic apparatus and the second information is derived at least from information identifying the venue; and wherein the first information comprises product data of the recommended product; and wherein the second information comprises at least one of promotional information and stock information of the recommended product.

18. An electronic apparatus having a display, the electronic apparatus being a demonstration model present at a venue, comprising circuitry configured to:

send, to a server, a first instance of information identifying the electronic apparatus and the venue in which the electronic apparatus is on present;

receive, once the server has successfully authenticated an identify of the electronic apparatus, a machine readable visual representation generated by the server based on the information identifying the electronic apparatus and the venue; and the electronic apparatus further comprising:

a display device for displaying the machine readable visual representation and for receiving user inputs allowing a user to enter commands to the electronic apparatus.

* * * * *